United States Patent
Stoschek

[11] 4,124,815
[45] Nov. 7, 1978

[54] RADIO AND/OR TELEPHONE COMMUNICATION SYSTEM FOR A FLEET OF VEHICLES

[76] Inventor: Michael Stoschek, Schleifschrot, 8631 Ahorn, Germany

[21] Appl. No.: 789,523

[22] Filed: Apr. 21, 1977

[30] Foreign Application Priority Data

Apr. 28, 1976 [DE] Fed. Rep. of Germany ....... 2618701

[51] Int. Cl.² .................................. H04B 3/60
[52] U.S. Cl. ............................ 325/51; 325/16; 325/312; 325/353; 325/361
[58] Field of Search ............ 325/15, 16, 111, 117, 325/312, 314, 352, 353, 355, 361, 356, 51, 53

[56] References Cited

U.S. PATENT DOCUMENTS 2,731,555   1/1956   Beck .................................. 325/353

OTHER PUBLICATIONS

Comco-Model 812 Portamcom-All Solid State Mobile/Portable Transceiver-Communications Company — Oct. 1972.

Primary Examiner—Robert L. Griffin
Assistant Examiner—Marc E. Bookbinder
Attorney, Agent, or Firm—Toren, McGeady and Stanger

[57] ABSTRACT

In a fleet of vehicles, all the vehicles are provided with permanently installed antennas, cable connections, control unit mounts, and transmitter-receiver mounts. Transmitter-receivers and control units, less in number than the number of vehicles in the fleet, are removably secured in the mounts of selected vehicles as needed.

1 Claim, 1 Drawing Figure

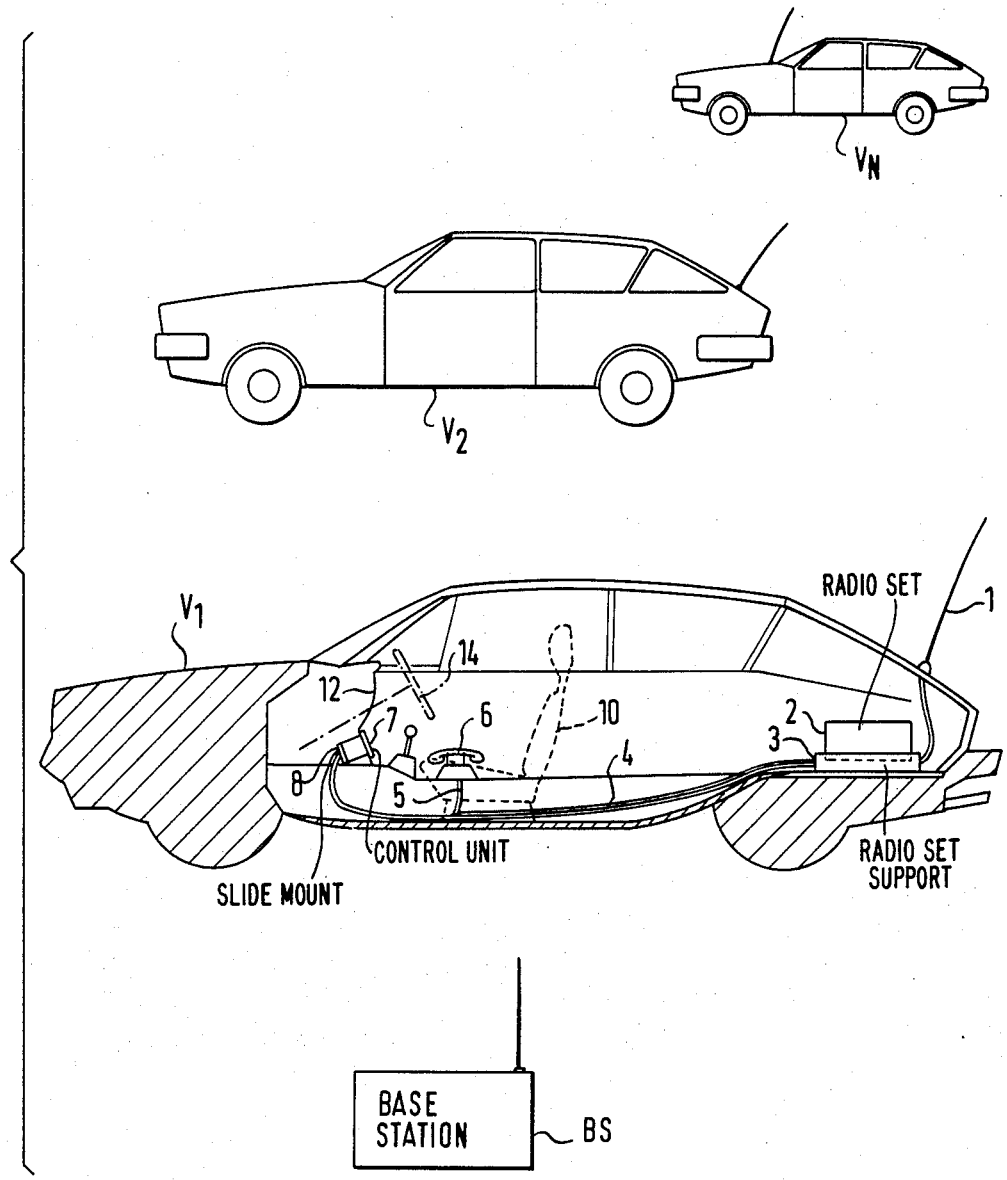

RADIO AND/OR TELEPHONE COMMUNICATION SYSTEM FOR A FLEET OF VEHICLES

BACKGROUND OF THE INVENTION

This invention relates to mobile communication systems, particularly for radio or telephone communications between one of several vehicles and a communication partner, such as another one of the vehicles or a central exchange or base station.

Large companies or government agencies frequently maintain large pools or fleets of vehicles such as cars equipped with radios or radio-telephones which can be used to establish quick contact between the vehicles or between a vehicle and a base station or exchange. The term "base station" refers to any type of central office which keeps in contact with the vehicle. Each car is normally equipped with a radio set (i.e. a transceiver), a service and control unit, a hearing and speaking apparatus such as an earphone-microphone handset, and an antenna. The radio set is most often found in the trunk of the vehicle, and the antenna is mounted on the rear of the vehicle because of the need to provide a short antenna connection. A cable or cable harness connects a service and control unit with the transceiver and is located either in the dashboard of the vehicle or in a bracket secured under the dashboard. Thus located, the unit makes possible to set the control adjustments necessary for establishing a radio or telephone connection in comfort. The hearing and speaking apparatus, such as a handset, is at the same time arranged within the immediate reach of the driver. In most cases it is mounted between the front seats.

With fleets having a great number of vehicles, from which connections must be established with one and the same exchange, the total costs required for these mobile apparatuses in each car are quite high. Frequently, however, only a part of the fleet of cars is in use. Hence, there are relatively long idle times for the costly equipment in the cars and the apparatuses are not sufficiently utilized.

The same problem exists in small organizations where, for example, one business car is equipped with the above-mentioned apparatus, but the same equipment would also be desirable for a personal car so that the owner could establish telephone contacts after regular business hours. However, in most cases, the personal car is not used during business hours. Hence, if both cars are equipped with a mobile communication system, this costly equipment is used inefficiently in that the operating time is insufficient.

An object of this invention is to avoid these problems. Another object of the invention is to provide a communication system which permits cost-justifying utilization of the equipment installed in the vehicles by avoiding the aforementioned long idle times.

SUMMARY OF THE INVENTION

According to a feature of the invention, these objects are obtained in a communication system of the above described type by fixedly installing each vehicle's radio antenna, the hearing and speaking apparatus including the microphone, and the cabling necessary between all these units and by removably mounting a small number of units relative to the total number, i.e. a transceiver and a service and control unit, in fixedly installed automatically locking supports or slide mounts.

The invention is based upon the recognition that the apparatus of the vehicles which are not being used can be used in other vehicles. The invention reduces the total number of apparatuses used by rapidly exchanging those apparatuses which particularly contribute to the high investment costs. These are primarily the radio set (transceiver) and the service and control unit. The radio antenna, the microphone and speaker, and the cabling required between all the units are fixedly installed. However, because the transceiver and the service and control unit can be rapidly exchanged, only as many transceivers and service and control units corresponding to the number of vehicles actually on the road are employed. In small companies it is possible to remove the transceiver and control unit from a business car after business hours and mount it in a personal car. This also reduces the investment costs of this expensive apparatus.

According to another feature of the invention, automatically locking, fixedly installed, mounting supports or slide mounts which permit rapid exchange of the apparatuses, are provided in each car. The fixedly installed automatically locking supports preferably serve for mounting the transceiver in the trunk compartment of a car, while the slide mount in the dashboard or bracket underneath permits rapid exchange of the service or control unit.

According to another feature of the invention, other devices are provided after removal of the radio set or service and control unit, for example, a receptable for car accessories or an ashtray.

The term "service and control unit" refers, for example, to a unit having a channel selector, mode selector (AM, FM, SSB, etc.) on-off switch, volume control, or any combination of these.

The above and other features of the invention are pointed out in the claims. Other objects and advantages of the invention will be evident from the following detailed description when read in light of the accompanying drawing.

BRIEF DESCRIPTION OF THE DRAWING

The sole drawing illustrates a fleet of cars operating with a base station and embodying features of the invention.

DETAILED DESCRIPTION OF PREFERRED EMBODIMENTS

In the drawing, N vehicles $V_1, V_2, \ldots V_N$, which are illustrated as automobiles or cars but which may also be trucks, boats, etc., are adapted for communication with each other and/or with a base station, central office, or exchange ES. The vehicle $V_1$ is equipped with a radio antenna 1, a radio set 2 (e.g. in the form of a transceiver or transmitter-receiver) which is mounted in a support 3, a cable or cable harness 4, 5, and a speaker-microphone apparatus 6 (in the form of a telephone set in which an earphone and microphone are mounted in the handset). Also, in the vehicle $V_1$, a service and control unit 7 (e.g. a channel tuning and control module that may perform functions such as switching, fine tuning, volume control, and selecting of one of the AM, SSB, or FM operating modes), is supported by a slide mount 8. The vehicle $V_1$ is a complete automobile with rear seats, engine, etc. For clarity, only details such as a front seat 10, a dashboard 12, and a steering column with a steering wheel 14, are illustrated in broken and dot-dash lines.

The radio set is arranged in the support 3 which is preferably in the form of a base equipped with a multiple connector plug or jack. The radio set 2 can be connected with the rest of the equipment simply by inserting it into the support 3 because the radio antenna is connected directly to the support 3 through an antenna cable. Similarly, the cable harness 4, 5, is connected directly to the support 3. According to an embodiment of the invention, the support 3 is equipped with mechanical snap closures which permit simple and safe mounting of the radio set 2 by mere insertion of the radio set into the support 3. When the radio 2 is needed for another vehicle, it is easily removed from the support 3 and used in another correspondingly equipped vehicle.

According to an embodiment of the invention, such a receptacle for car accessories are inserted and held with the snap closures.

Similarly, the unit 7 is secured in a bracket underneath the dashboard. Here it is necessary to furnish a recess into which the unit 7 can be inserted as part of a slide mount. The corresponding mating portion, which is similarly equipped with a multiple connector plug or jack is illustrated at 8. The cable harness 4,5 connects the slide mount 8 with the support 3 of the radio set 2. When the unit 7 is removed from the bracket, another device such as an ashtray may be inserted in its place.

The speaker-microphone apparatus 6 is installed between the front seat of the vehicle and a branch cable 5 of the cable 4 connects it to the unit 7 on the one hand and the radio set 2 on the other.

The installation and arrangement illustrated in the drawing is merely an example of one embodiment. The cable or cable harness 4 need not necessarily, as illustrated, pass through a lower body tunnel. According to an embodiment of the invention the cable is laid inside the roof structure. Furthermore, according to another embodiment of the invention, the radio set 2 as well as the radio antenna is mounted in the forward portion of the vehicle when the necessary space is available for this purpose. In trucks, other arrangements and installations are utilized on the basis of the spatial relationships.

Each of the vehicles $V_1, V_2 \ldots V_N$, is provided with devices 1, 3, 4, 5, 6, and 8. However, only the vehicles most involved in the communication process at any one time, such as the vehicles $V_1$ and $V_N$, are provided with the units 2 and 7. When a vehicle such as $V_1$ is no longer being used, e.g. when it is being repaired, and the vehicle $V_2$ is used, then the units 2 and 7 are removed from the vehicle $V_1$ and mounted in the vehicle $V_2$.

According to an embodiment of the invention, contemporarily available auto-installed public telephone apparatuses are utilized in a number of vehicles such as automobiles.

Automobile telephones are composed essentially of four parts.

1. Transmitter and receiver portion,
2. Operating unit (dial),
3. Handset with speaker and microphone, and
4. Antenna.

Aside from this, there is also need for a cable arrangement which establishes the connection between these parts. The first two parts represent more than 90 percent of the value of the total installation.

Hitherto manufacturers have prescribed that all four parts be permanently installed in the car. This alone amounts to a substantial investment.

If telephones have to be installed in several vehicles of a pool or fleet of a large company or government agency, the cost of installation for each vehicle is extremely high. This is true also of equipping a personal car as well as a business car with a telephone.

According to the invention, the expensive parts, i.e., the dial set and transmitting-receiving unit, need be purchased only once, or only once for each main connection. Only the more inexpensive parts, i.e. the receiver and antenna, are permanently installed in each car. This makes sense economically and achieves all technical requirements, because the receiver, antenna, and cabling must be fixedly connected in each vehicle (a one-time installation expense).

Experience has shown that for example, in a medium sized vehicle fleet only a few cars need be reachable by telephone at one time, but that the particular cars which must be reached while on the road varies. The one-time acquisition of transceivers and operating units for a fraction of the vehicles, as well as the simple equipment for all the cars with these parts, represents substantial savings and costs.

Another advantage for the manufacturer is that many potential customers who in the past shied away from the relatively high cost of the telephone in a single car, may now be ready to buy such a system, since it is now possible to equip any number of cars at practically the same or only slight higher cost. This permits the better utilization of the installation.

The exchange of the expensive apparatus is effected by quick-action plug-jack connections at the cable terminals and snap closures in the mounting supports. The cables are fixedly installed in the car and need be installed only once. This is also true for the receiver and the antenna. The recess left in the dashboard by the missing control unit can be filled either by a cover plate or by another part, for example, an ashtray.

The space occupied by the radio set in the truck compartment can be filled with a repair kit, etc. This also allows snap closures to be used.

What is claimed is:

1. A system for communication between one of a plurality of vehicles and a communication partner composed of at least one other vehicle or an exchange, comprising: a plurality of vehicles; each vehicle having radio set mounting means fixedly mounted in the vehicle for holding and electrical connection to a radio set, control unit mounting means fixedly mounted in the vehicle for holding and electrically connecting to a control unit, a receiver fixedly mounted in the vehicle, a radio antenna fixedly mounted to the vehicle, cable means in the vehicle for electrically connecting said radio set mounting means and said control unit mounting means as well as said receiver and said antenna to each other; a plurality of radio sets smaller than the plurality of the vehicles, a plurality of control units smaller than the plurality of vehicles, said radio sets and said control units being removably mounted in predetermined ones of said mounting means at any one time while others of said mounting means remain empty of radio sets and control units, said mounting means including one of self-locking mounting supports and slide mounts.

* * * * *